United States Patent [19]

Detampel et al.

[11] Patent Number: 4,679,845
[45] Date of Patent: Jul. 14, 1987

[54] MOTOR VEHICLE WINDSHIELD COWL PLATE

[75] Inventors: Heinz Detampel, Russelsheim; Frank Hillemann, Ginsheim; Wolfgang Jobst, Nauheim; Manfred Prien, Enkenbach, all of Fed. Rep. of Germany

[73] Assignee: General Motors Corporation, Detroit, Mich.

[21] Appl. No.: 760,898

[22] Filed: Jul. 31, 1985

[30] Foreign Application Priority Data

Aug. 1, 1984 [DE] Fed. Rep. of Germany ....... 3428293

[51] Int. Cl.⁴ ...................... B62D 25/10; B62D 27/00; B60J 1/02
[52] U.S. Cl. ................... 296/192; 296/84 A; 296/84 D; 296/31 P
[58] Field of Search .............. 296/93, 84 A, 84 D, 296/191-194, 187, 208, 84 R (U.S. only), 31 P

[56] References Cited

U.S. PATENT DOCUMENTS

| 1,829,751 | 11/1931 | Ledwinka | 296/192 |
| 3,637,254 | 1/1972 | LaPointe et al. | 296/84 A |
| 4,402,537 | 9/1983 | Gallitzendorfer et al. | 296/191 |

FOREIGN PATENT DOCUMENTS

| 0013970 | 8/1980 | European Pat. Off. | 296/192 |
| 0099115 | 1/1984 | European Pat. Off. | 296/192 |
| 1150895 | 6/1963 | Fed. Rep. of Germany | |
| 2445776 | 9/1980 | France | 296/84 D |
| 0104470 | 6/1982 | Japan | 296/192 |
| 546007 | 6/1942 | United Kingdom | 296/192 |
| 682147 | 11/1952 | United Kingdom | 296/192 |
| 732875 | 6/1955 | United Kingdom | 296/192 |

Primary Examiner—Robert B. Reeves
Assistant Examiner—Dennis H. Pedder
Attorney, Agent, or Firm—Charles E. Leahy

[57] ABSTRACT

The windshield is adhesively secured on the firewall or other vehicle body structure with the lower edge of the windshield extending forwardly and downwardly from the point of attachment. The windshield plate is molded plastic and has an integral channel member at the rearward edge thereof defining a groove which receives the lower edge of the windshield and contains a groove-shaped elastomeric member which seals and retains but permits limited lateral movement of the windshield plate relative to the fixed windshield. The windshield plate is preferably formed of separate left-hand and right-hand portions, one having a longitudinally extending groove and the other having a longitudinally extending tongue member which extends into the groove in order to retain the left and right-hand portions together and yet permit relative lateral movement between the left and right-hand portions. In addition, the left and right-hand portions have downwardly and forwardly angled forward edge portions which extend underneath the hood in order to conceal the engine compartment from view through the opening between the hood and the windshield plate.

3 Claims, 5 Drawing Figures

MOTOR VEHICLE WINDSHIELD COWL PLATE

The invention relates to a motor vehicle including a plastic windshield plate which closes the space between the hood, fenders and the windshield.

BACKGROUND OF THE INVENTION

The problem of using a plastic windshield plate of this type is that of mounting the same to the motor vehicle. First of all, manufacturing tolerances of the adjacent components, such as the windshield, fender, A-columns, hood and windshield wiper or windshield wiper components must be taken into consideration. In addition to these installation tolerances, one must also take into consideration the expansion of the material of the windshield plate. The coefficient of expansion of such a component made of plastics will differ substantially from that of the other components made of sheet metal. On the other hand, the windshield plate must not be installed with too much play because of the likelihood of flutter that might occur during vehicle travel due to vehicle vibrations and the wind forces.

In prior art arrangements, the windshield plate was mounted, while considering the differences in the coefficients of expansion, by way of numerous fastening elements, with the result of high product and production costs. Furthermore, in order to compensate for the different coefficients of expansion, the tolerance allowances that had to be made between the windshield plate and the windshield were unsatisfactory.

It is the object of the present invention to provide a windshield plate of the type described in the foregoing which, while being suited for proper mounting to the vehicle and requiring only a minimum of tolerance allowances, is characterized by its ease of repair and pleasing appearance as well as its low product and production costs.

SUMMARY OF THE INVENTION

According to the present invention, this objective is met in that the windshield is freely extending below and forwardly from its adhesive attachment to the firewall and extends into a channel section which is provided on the rear edge of the windshield plate. Experience with this arrangement has been surprisingly favorable and has shown that in spite of the differences in the coefficients of expansion, this mounting arrangement, which is essentially a form-locking type connection between the windshield and the windshield plate by means of the channel rail section, is one in which these two components are fixed to one another in a satisfactory and reliable manner. Preferably, an elongate elastomeric member of appropriate channel sectional shape is fitted into the channel section and is arranged between it and the windshield. In addition to the form-locking connection, the elastomeric member provides a force-locking type connection between the windshield and the channel section and thus the windshield plate. The channel member gives the illusion of being an integral part of the windshield panel, so that the joint between the windshield plate and the windshield, rather than being conspicuous, looks very attractive. By virtue of the fact that it is relatively difficult to detect that the windshield panel is secured to the windshield, the streamline appearance of the windshield section incorporating the windshield panel is enhanced. Moreover, the windshield/windshield panel arrangement assembles easily and quickly in that the channel section on the windshield panel is simply slipped into the windshield, in contrast to prior art arrangement wherein individual fastening elements had to be aligned and secured to one another. The final result is that manufacturing costs are correspondingly low.

In view of the relatively large expansion to which plastic materials are subjected, the preferable arrangement is one in which a left portion of the windshield panel has a tongue-like member which extends into a groove of appropriate section of a right-hand portion of the windshield panel. This will enable free movement of both windshield panel portions, an arrangement which is particularly advantageous with respect to securing the same to the remainder of the vehicle body which, due to the normal stresses associated with vehicle travel, is subjected to elastic deformations and is acting on the windshield panel through deformation movements. This arrangement will also provide to compensate for production tolerances. Thus, the tolerances of the other fastening elements need not be as close any more, because the parts of the windshield panel may be individually aligned onto these fastening elements. This, too, amounts to an improved mounting arrangement at lower production costs and contributes to better serviceability.

One particularly advantageous aspect is that the windshield plate is arranged on the fenders and the windshield wiper component by means of fastening elements, one for each fender and one for the wiper component. Therefore, in addition to being secured to the windshield, the windshield plate is suspended only on three points, an arrangement that must be considered the minimum necessary for mounting the windshield plate in a plane. Accordingly, the product and production costs are also being reduced to a minimum, and serviceability is excellent.

DESCRIPTION OF THE PREFERRED EMBODIMENT

Figure 1:
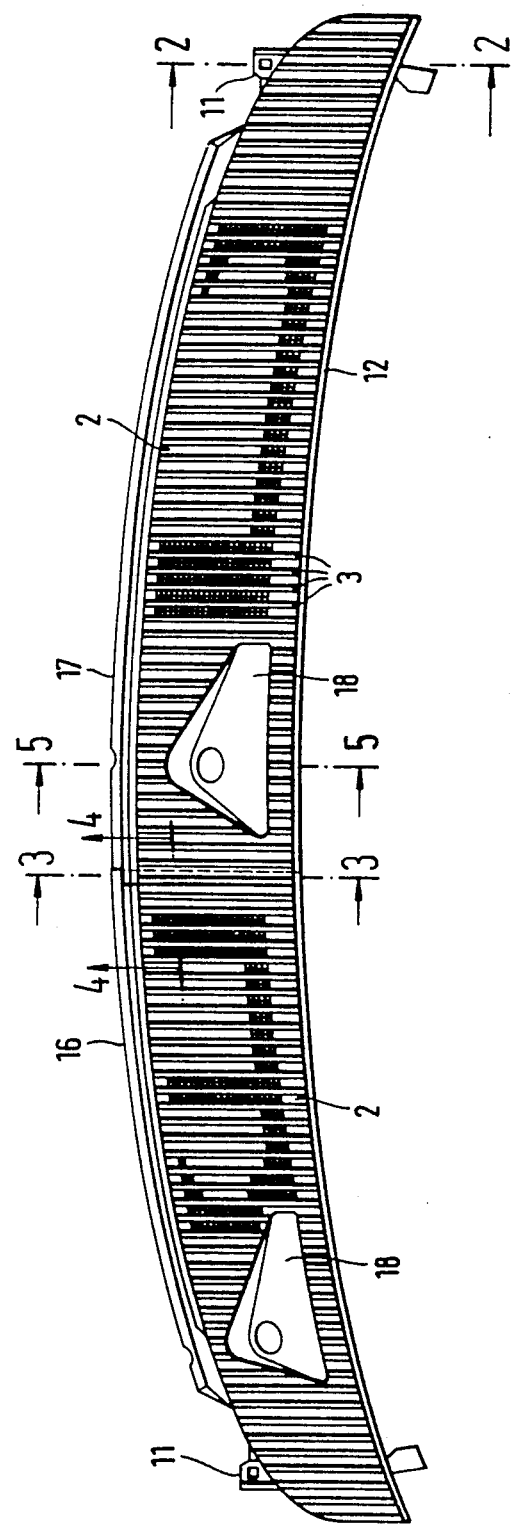
FIG. 1 is a plan view of the windshield panel according to the invention.

FIG. 1 is a plan view of the windshield plate 2 of molded plastic. The windshield plate 2 is comprised of a left portion 16 and a right portion 17 which are interlocked to one another by a tongue-and-groove-type joint as will be described hereafter, in greater detail by reference to FIGS. 3 and 4. The windshield plate 2 has left and right recesses 18 provided for accommodating the transitional portion between the windshield wiper shaft and the windshield wiper arm, as well as the opening in the windshield plate 2 itself for the windshield wiper shaft. The windshield plate 2 is provided with ribs 3 which will come to be located in the direction of vehicular travel, i.e., in the longitudinal direction of the vehicle. The windshield plate 2 has apertured lugs 11 fitted on each of its left and right ends for receiving the fastening elements (not illustrated in FIG. 1) by which the windshield plate 2 is mounted to the fenders. A channel member 12 for receiving the windshield is provided at the rear edge of the windshield panel 2 as will be described hereafter.

Figure 2:
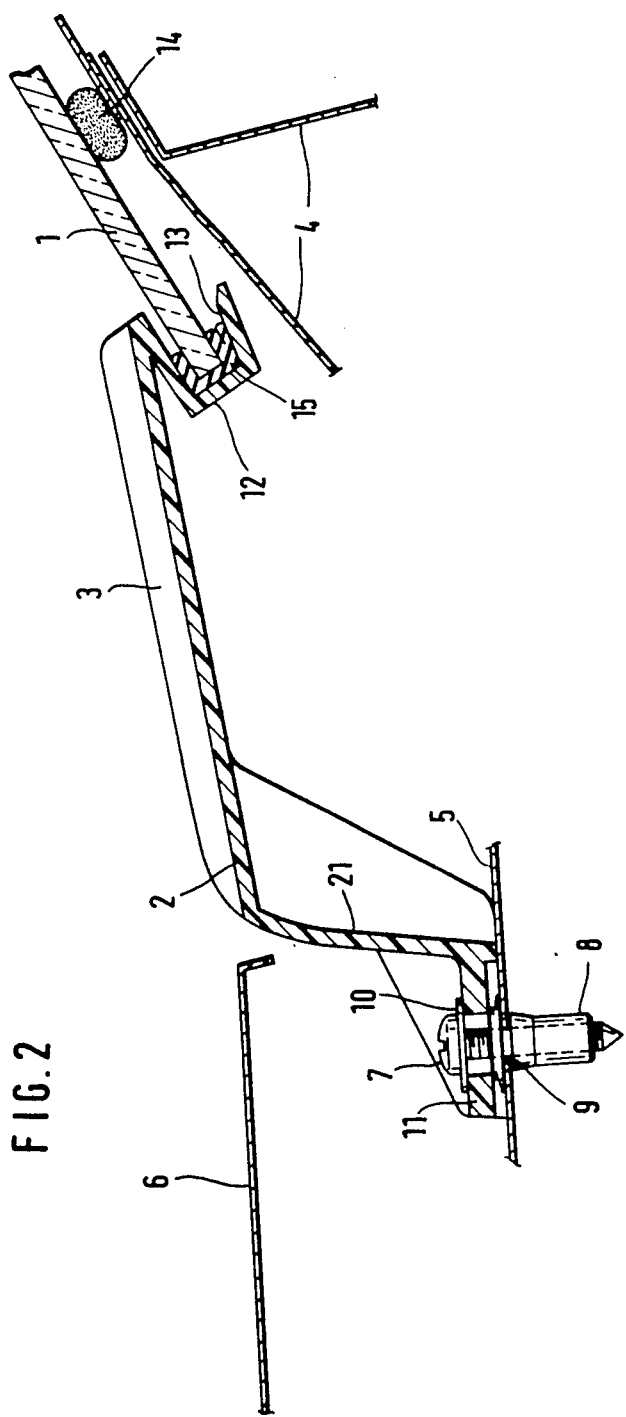
FIG. 2 is a sectional view along line 2—2 of FIG. 1.

FIG. 2 is a sectional view along line 2—2 of FIG. 1. This sectional view illustrates the apertured lug 11. In this lug 11 there is disposed a sheet metal screw 7 with a washer 10 which is adapted to extend through an aperture 9 provided in the fender 5 and which is secured to the fender 5 by a plug-in nut 8 on the backside thereof. The apertured lug 11 is formed on a forward wall portion 21 of the windshield plate 2 that is extending therefrom at a suitable angle. This wall portion 21 extends below the hood 6 which, otherwise, is substantially flush with the windshield plate 2. The windshield plate 2 according to the invention, in turn, adjoins the windshield in substantially flush relationship therewith and the windshield 1 extends into the channel member 12 of the windshield plate 2. For this purpose, the channel member 12 is disposed on the rearward edge of the windshield plate 2, opposite to the wall portion 21 and towards the inside of the vehicle and adjacent to the firewall 4. The windshield 1 is mounted, as is usual, onto the firewall 4 by means of an adhesive material 14 and the lower edge of the windshield extends further forward and downward from the adhesive material 14. The windshield plate 2 is retained on the windshield 1 by a groove 13 of the channel member 12 which receives the lower edge of the windshield 1 and contains a groove-shaped elastomeric member 15 which ensures compensatory friction-type locking between the windshield 1 and the channel member 12 of windshield plate 2, but at the same time permits limited lateral movement of the left-hand portion 16 and the right-hand portion 17 relative to each other and the windshield 1.

Figure 3:
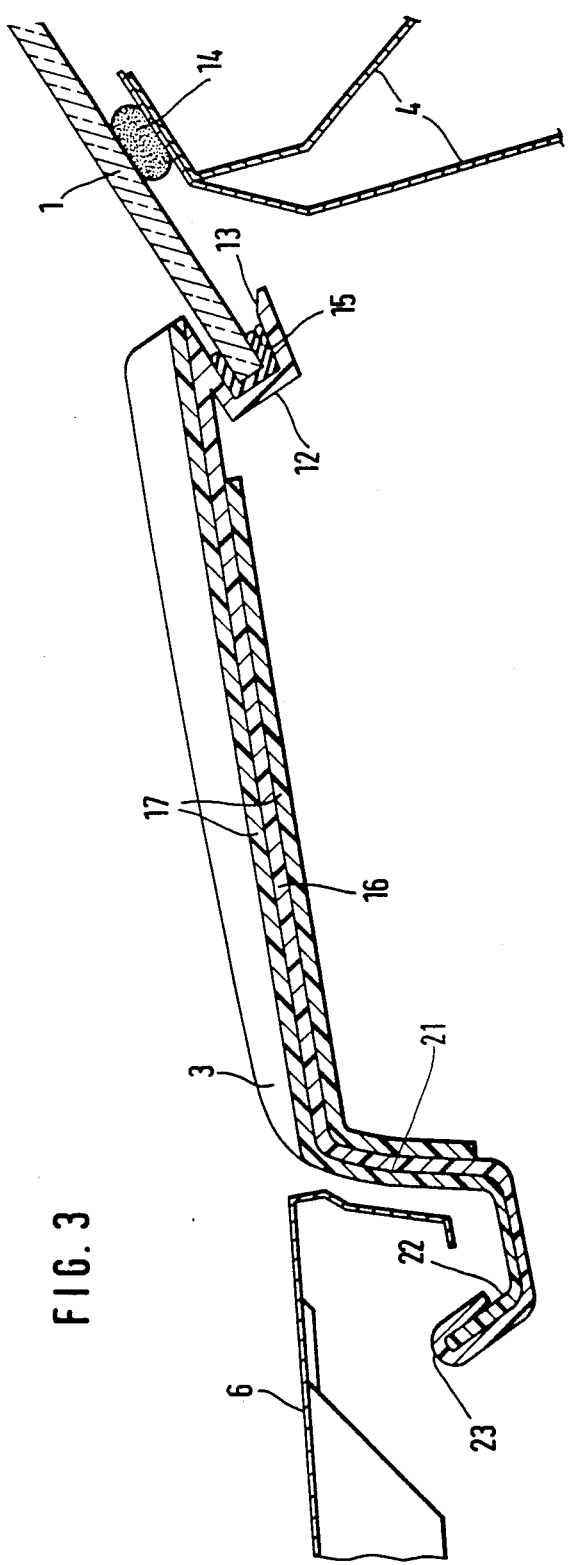
FIG. 3 is a sectional view along line 3—3 of FIG. 1.
Figure 4:
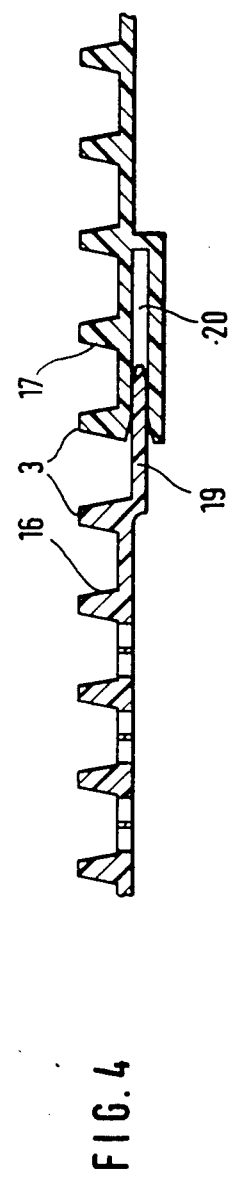
FIG. 4 is a sectional view along line 4—4 of FIG. 1.

FIG. 3 is a cross-sectional view along the line 3—3 of FIG. 1 and illustrates how the left portion 16 and the right portion 17 of the windshield plate 2 are interlocked with one another. For this purpose, the right portion 17 is provided with a profiled groove portion having a groove 20 which is engaged by the tongue-like member 19 of the left portion 16, as best seen in FIG. 4. In order to retain the right-hand portion 17 in its relative position with respect to the left-hand portion 16, the right-hand portion 17 includes an angled forward edge portion 22 which extends forwardly and slidably into an angled reversely bent profile member 23 provided on the angled forward edge portion of the left-hand portion 16. The angled forward edge portion 22 of the right-hand portion 17 and the profile member 23 of the left-hand portion 16 extend sufficiently forward from the wall portion 21 to underlie the rearmost edge of the hood 6 and thereby conceal the view into the engine compartment through the space between the hood 6 and the windshield plate 2.

FIG. 4 is the section along line 4—4 of FIG. 1 and illustrates how the tongue-like member 19 of the left portion 16 of the windshield plate 2 slidably engages the groove 20 of the right-hand portion 17 of the windshield plate 2. This arrangement will provide free expansiblity for the windshield plate 2.

Figure 5:
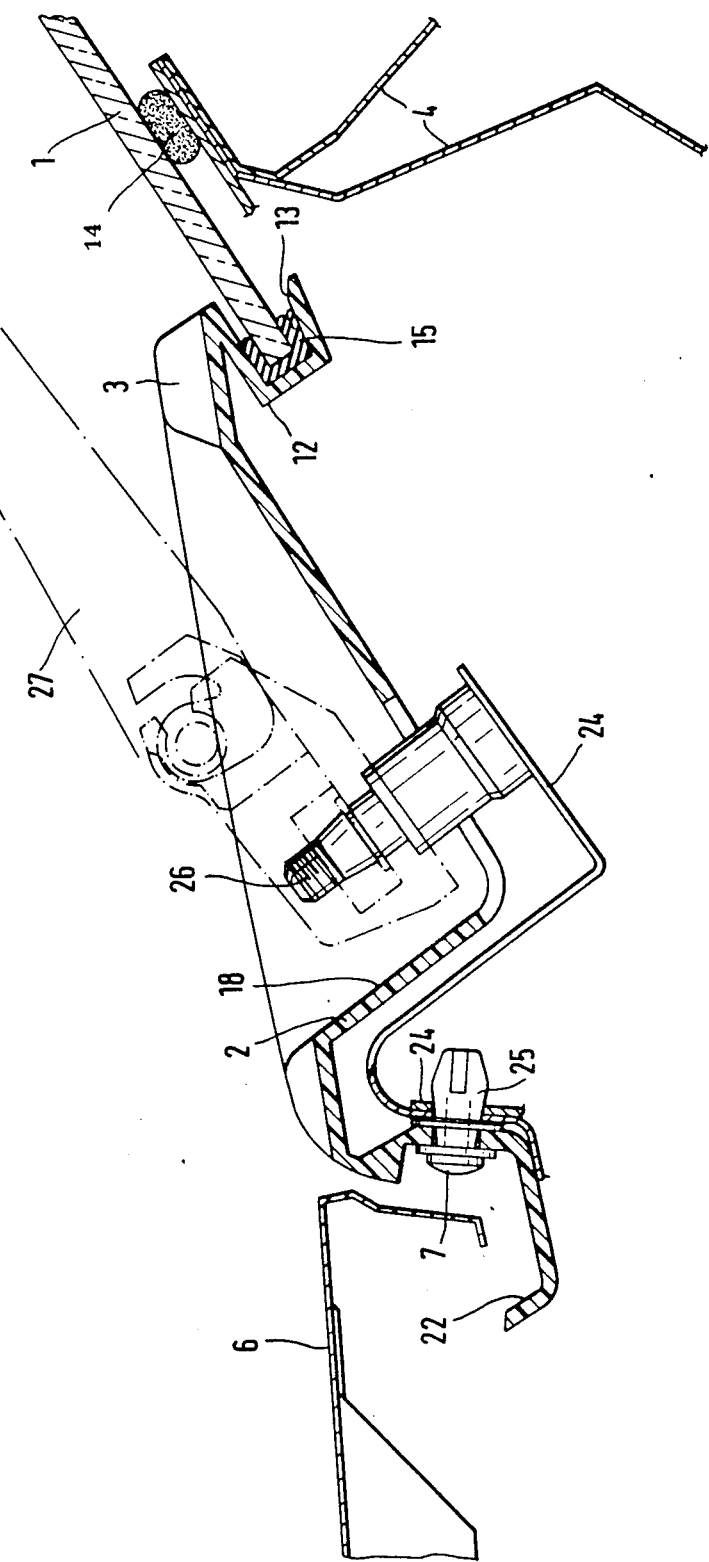
FIG. 5 is a sectional view along line 5—5 of FIG. 1.

FIG. 5 illustrates the section along line 5—5 of FIG. 1. Here, the windshield plate 2 is fastened to the windshield wiper support member 24 by means of a sheet metal screw 7 and a plug-in expansion-type nut 25. The windshield wiper support member 24 also serves as a mounting means for the windshield wiper shaft 26 with the wiper arm 27. The latter parts are disposed in the recess 18 of the windshield plate 2. The sheet metal screw 7 extends through the windshield plate 2 in the area of the angled forward edge portion 22.

Thus, it is seen that the invention provides a new and improved windshield plate for closing the space between the windshield, the hood, and the fenders.

The embodiments of the invention in which an exclusive property or privilege is claimed are defined as follows:

1. In a motor vehicle body, a structure adapted to close the space between the hood, a windshield fixed on the vehicle body structure and the fenders, comprising:
   said windshield being adhesively secured to the vehicle body and having an exposed cantilevered lower edge extending freely forwardly and downwardly relative the vehicle body structure to which the windshield is adhesively attached;
   and a molded plastic windshield plate adapted to substantially close the space between the hood, fenders and the windshield, said windshield plate having a rearward edge and an integral channel member disposed on the rearward edge defining a groove receiving the cantilevered lower edge of the windshield to provide a substantially flush adjoining relationship between the windshield plate and the windshield and function to mount the rearward edge of the windshield plate on the vehicle body and yet enable lateral movement of the windshield plate relative to the windshield whereby the plastic windshield plate adjustably closes the space between the hood, the fenders and the fixed windshield.

2. In a motor vehicle body, a structure adapted to close the space between the hood, a windshield fixed on the vehicle body structure and the fenders, comprising:
   said windshield being adhesively secured to the vehicle body and having an exposed cantilevered lower edge extending freely forwardly and downwardly relative the vehicle body structure to which the windshield is adhesively attached;
   and a molded plastic windshield plate adapted to substantially close the space between the hood, fenders and the windshield, said windshield plate being comprised of molded plastic right-hand and left-hand portions separately attached to the vehicle body and having interfitting tongue-and-groove connection therebetween to permit relative lateral movement, each of said left and right-hand portions having an integral channel member disposed on the rearward edge thereof defining a groove receiving the cantilevered lower edge of the windshield to provide a substantially flush adjoining relationship between the windshield plate and the windshield which functions to mount the rearward edge of the windshield plate on the vehicle body and yet enable lateral movement of the windshield plate relative to the windshield whereby the plastic windshield plate adjustably closes the space between the hood, the fenders and the fixed windshield.

3. In a motor vehicle body, a structure adapted to close the space between the hood, a windshield fixed on the vehicle body structure and the fenders, comprising:
   said windshield being adhesively secured to the vehicle body and having an exposed cantilevered lower edge extending freely forwardly and downwardly relative the vehicle body structure to which the windshield is adhesively attached;

and a molded plastic windshield plate adapted to substantially close the space between the hood, fenders and the windshield, said windshield plate being comprised of molded plastic right-hand and left-hand portions separately attached to the vehicle body and having interfitting tongue-and-groove connection therebetween to permit relative lateral movement, each of said left and right-hand portions having an angled forward edge portion extending to underlie the hood and a reversely bent profile member of one of the angled forward edge portions slidably fitting around the other angled forward edge portion to retain the left and right-hand portions relative one another, said right and left-hand portions further having integral channel members disposed on the rearward edges thereof defining grooves receiving the cantilevered lower edge of the windshield to provide a substantially flush adjoining relationship between the windshield plate and the windshield which functions to mount the rearward edge of the windshield plate on the vehicle body and yet enable lateral movement of the right and left-hand portions of the windshield plate relative to the windshield whereby the plastic windshield plate adjustably closes the space between the hood, the fenders and the fixed windshield.

* * * * *